JAMES FLOWER.
Improvement in Boring Bars for Facing the ends of Cylinders.
No. 122,243.  Patented Dec. 26, 1871.
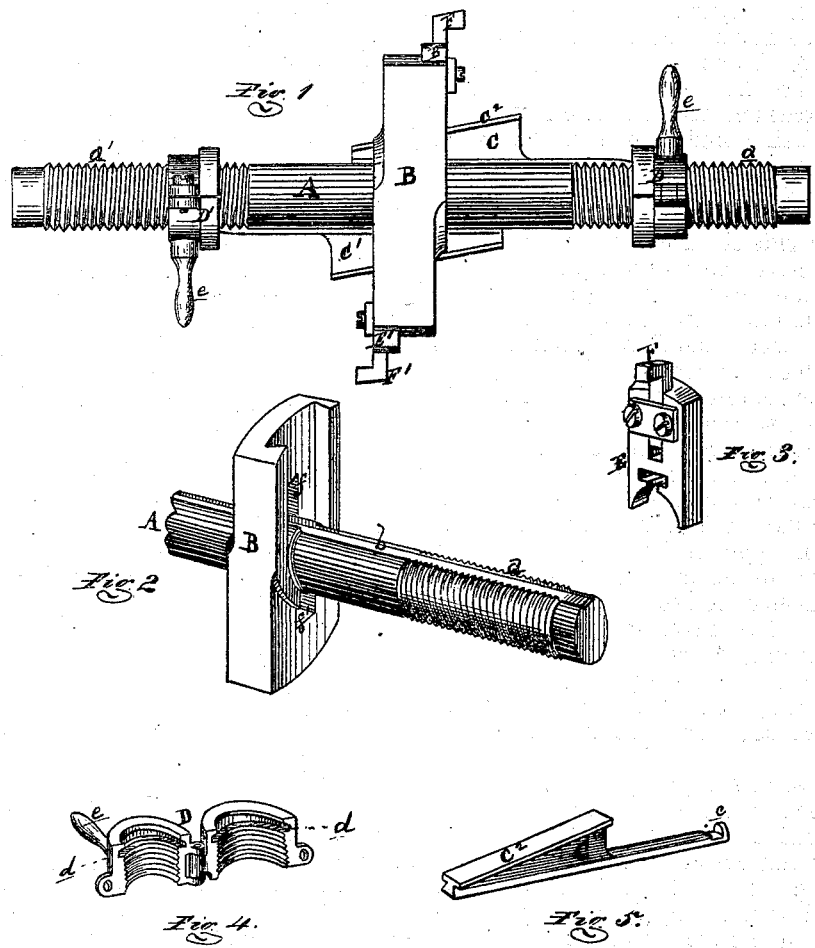

UNITED STATES PATENT OFFICE.

JAMES FLOWER, OF DETROIT, MICHIGAN.

IMPROVEMENT IN BORING-BARS FOR FACING THE ENDS OF CYLINDERS.

Specification forming part of Letters Patent No. 122,243, dated December 26, 1871.

*To whom it may concern:*

Be it known that I, JAMES FLOWER, of Detroit, in the county of Wayne and State of Michigan, have invented a new and useful Improvement in a Boring-Bar for Facing Up the Ends of Cylinders, Valve-Seats, &c.; and I do declare that the following is a true and accurate description thereof, reference being had to the accompanying drawing and to the letters of reference marked thereon and being a part of this specification, in which—

Figure 1 is a side elevation of my device. Fig. 2 is a perspective view of the bar and head. Fig. 3 is a perspective view of the tool-carrier. Fig. 4 is a similar view, showing one of the hinged nuts opened; and Fig. 5 is a similar view of one of the feed-wedges.

Similar letters of reference indicate corresponding parts in the several figures.

(Scale, seven-twelfths of the size of model.)

The nature of this invention relates to a boring-bar for facing up the ends of cylinders, valve-seats, and similar work, and so arranged that it may operate on opposite faces of the work without removing and turning around the bar after one face is finished before the other can be operated upon. The invention consists in the novel and peculiar construction of the boring-bar and head, and in the peculiar means employed for feeding out the tool-carrier or carriers, where two are used, as more fully hereinafter set forth.

In the drawing, A represents the boring-bar, in the middle of whose length is rigidly secured the boring-head B. At one side of the boring-head the bar has cut on it a right-hand screw-thread, $a$, and at the other side a left-hand thread, $a'$. $b$ is a dovetail-groove or way cut from one end of the bar longitudinally through the head to about the root of the other thread, a similar one being cut on the opposite side of the bar from the other end. C is a dovetail-feather sliding in one of the ways, and is formed at one end with a T-headed inclined plane or wedge, $C^2$, and at the other extremity with an outwardly-turned flange, $c$. $C^1$ is a similar feather in like manner arranged in the other groove or way. D is a nut in two segments hinged together, as shown in Fig. 4, and so arranged as to be secured by a screw or bolt passing through the lugs and the joining ends that it may engage with the thread $a$ of the boring-bar. The nut has an annular groove or recess, $d$, turned in its bore to receive the flange $c$ of the feather. $e$ is a stop-pin projecting from the nut. $D'$ is a similar nut in like manner arranged to work on the screw-thread $a'$.

When the boring-bar is centered and chucked in a lathe and motion imparted to it in one direction, and the nuts D D' prevented from turning by placing a rest under their stop-pins $e$, or by any other equivalent means, the nuts and their feathers C C' will approach each other; by reversing the motion of the boring-bar they will recede from each other.

The boring-head is slotted, as shown at $ff'$ in Fig. 2, in the path of the feathers to permit their inclined planes to pass through. On the face of the boring-head, adjacent to the right-hand thread of the bar, a dovetail recess is formed in the head to receive a flush tool-carrier, E, which has a radial movement therein, and which carries a square-nosed tool, F. The tool-carrier has a transverse T-slot in its base inclined to the angle of the wedge $C^2$, which engages therein, so that, when the feathers approach each other, it is evident that the tool-carriers will be forced outward, and vice versa, thus giving the tool the necessary "feed." $E'$ is the tool-carrier, similarly arranged on the opposite face of the other arm of the head; and $F'$ is its tool.

The operation of this tool with the foregoing description will be so readily understood on reference to the accompanying drawing that any further explanation is deemed superfluous.

I do not wish to confine myself to the double boring-head herein shown and described, as a single one is similar in construction, only leaving off the additional thread, nut, feather, and tool-carrrier, the operation being the same, only that the bar must be turned end for end when a second side of the work is to be faced.

What I claim as my invention, and desire to secure by Letters Patent, is—

1. The construction and arrangement of the boring-bar A, head B, tool-carrier E, feather C with its inclined plane C², moving in the dovetail way b, and the hinged segmental nut D provided with the internal groove d, and radial stop-pin e, as and for the purpose set forth.

2. The construction and arrangement of the boring-bar A, head B, tool-carriers E E', feathers C C¹, and their inclined planes C² moving in the ways b b, and hinged segmental nut D D' operating substantially as herein described, for the purpose specified.

JAMES FLOWER.

Witnesses:
H. F. EBERTS,
MYRON H. CHURCH. (100)